(12) United States Patent
Lee et al.

(10) Patent No.: US 8,817,042 B2
(45) Date of Patent: Aug. 26, 2014

(54) GRAPHIC RENDERING SYSTEM AND PROJECTION METHOD THEREOF

(75) Inventors: Shin-Yuan Lee, Taipei County (TW); Zong-Hong Lyu, Nantou County (TW)

(73) Assignee: Institute for Information Industry, Taipei (TW)

( * ) Notice: Subject to any disclaimer, the term of this patent is extended or adjusted under 35 U.S.C. 154(b) by 484 days.

(21) Appl. No.: 13/154,388

(22) Filed: Jun. 6, 2011

(65) Prior Publication Data

US 2012/0218291 A1    Aug. 30, 2012

(30) Foreign Application Priority Data

Feb. 25, 2011    (TW) .............................. 100106380 A

(51) Int. Cl.
*G06T 15/30*    (2011.01)

(52) U.S. Cl.
USPC .......................................... 345/620; 345/427

(58) Field of Classification Search
None
See application file for complete search history.

(56) References Cited

U.S. PATENT DOCUMENTS

2004/0021675 A1 *    2/2004    Brkic .............................. 345/672
2009/0046098 A1 *    2/2009    Barone et al. ................. 345/420

* cited by examiner

*Primary Examiner* — David H Chu
(74) *Attorney, Agent, or Firm* — Skaar Ulbrich Macari, P.A.

(57) ABSTRACT

A graphic rendering system and a projection method thereof are provided. The graphic rendering system comprises a processing unit and a storage unit. The storage unit stores a piece of information. The information defines a virtual area in a camera space, wherein the virtual area has three vertices. The processing unit calculates two intersection vertices between the virtual area and near clipping plane of a view volume of the camera space. The processing unit transforms the three vertices and the two intersection vertices to a screen space and derives three projection vertices and two projection intersection vertices. The processing unit decides a valid area, chooses a test vertex from the valid area, and decides whether the signs of the three projection edge functions defined by the three projection vertices should be changed. Then, the processing unit decides pixels to be rendered according to the valid area, projection edge functions, and a predefined window clipping region.

16 Claims, 8 Drawing Sheets

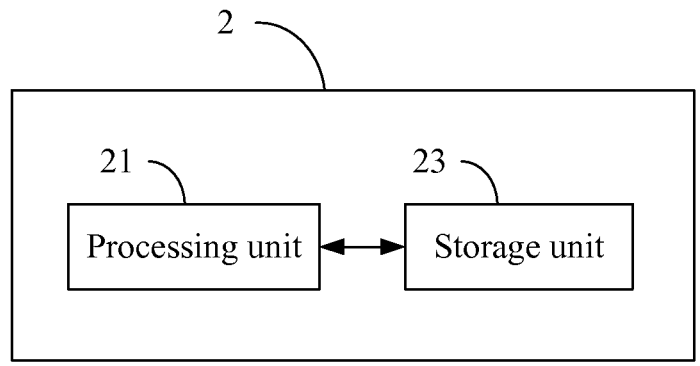
FIG. 2A
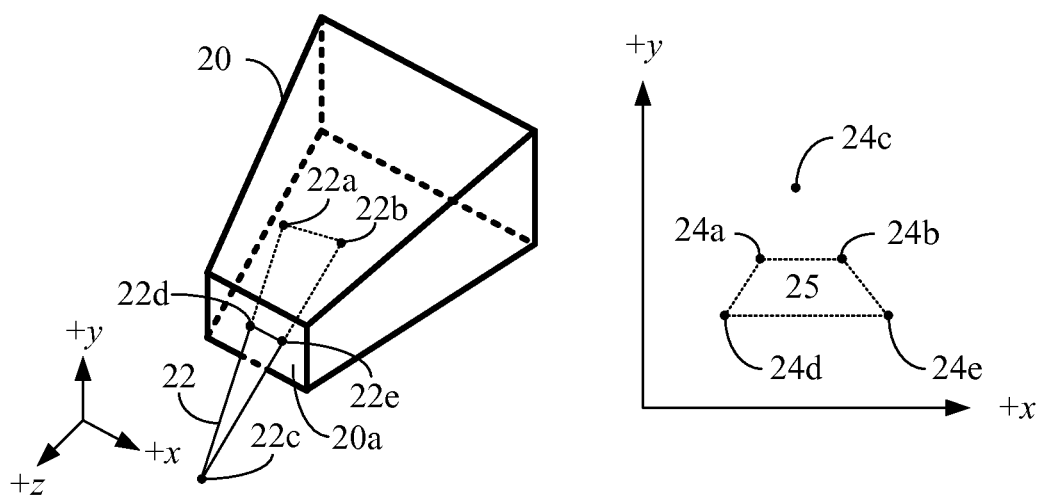
FIG. 2B
FIG. 2C

GRAPHIC RENDERING SYSTEM AND PROJECTION METHOD THEREOF

PRIORITY

This application claims priority to Taiwan Patent Application No. 100106380 filed on Feb. 25, 2011, which is hereby incorporated herein by reference in its entirety.

FIELD

The present invention relates to a graphic rendering system and a projection method thereof; and more particularly, the present invention relates to a graphic rendering system for processing a near clipping plane of a camera space and a projection method thereof.

BACKGROUND

Over recent years, computer graphic rendering technology has experienced rapid development. Correspondingly, computer graphic rendering technology has found wide application in various fields, such as the film industry, computer games industry, and the like. In three-dimensional (3D) graphics, an object is formed by a plurality of primitives. A graphic rendering system transforms the object from an object space sequentially into a world space, a camera space and then, through projection, into a screen space.

In camera space, the graphic rendering system defines a view volume 10, as shown in FIG. 1A. Since an object outside the view volume 10 will not be rendered in the screen space, clipping primitives must be performed by the general graphic rendering system. Furthermore, to avoid the problems caused when an object is placed too close to the camera or is disposed behind the camera, clipping must also be done on a near clipping plane 10a of the view volume 10 in the graphic rendering system. Specifically, when the object is too close to the camera, a problem of dividing by zero may occur. Besides, when the object is disposed behind the camera, the primitives may be flipped into the wrong area, as shown in FIG. 1B.

To avoid the aforesaid problems, a conventional graphic rendering system clips the primitives of an object with reference to the six planes of the view volume. In more details, when a primitive is a triangle and the triangle is clipped against to a plane of the view volume, one of the following four cases will occur: (a) the entire triangle 12 is outside the view volume 10 as shown in FIG. 1C, so the entire triangle 12 will be discarded; (b) the entire triangle 14 is inside the view volume 10 as shown in FIG. 1D, so the entire triangle 14 will be retained; (c) one of the vertices of the triangle 16 is inside the view volume 10 and the other two vertices of the triangle 16 are outside the view volume 10, in which case the triangle 16 will be clipped but no new triangle is generated as shown in FIG. 1E; and (d) two vertices of the triangle 18 are inside the view volume 10 and the other vertex is outside the view volume 10, in which case the triangle 18 will be clipped to generate new triangles 18a, 18b as shown in FIG. 1F. Additionally, if a triangle extends across more than one plane of the view volume, it is possible that multiple triangles will be generated.

The individual triangles obtained by clipping the object are then transformed into the screen space by the conventional graphic rendering system. Specifically, the individual triangles are transformed into a plurality of pixel points in the screen space. There are two approaches for transforming the individual triangles into a plurality of pixels in the screen space: scanning the screen space row by row or using an edge function to determine whether a pixel falls within the triangle. Since many new triangles are generated in the aforesaid clipping process, the graphic rendering system has to process more triangles in the process of transforming triangles into the pixels in the screen space. This increases the computational complexity and adds to the burden of the graphic rendering system.

Accordingly, there is still an urgent need in the art to provide a technology for projecting an object from the camera space into the screen space, which shall be able to solve the problems caused when the object is placed too close to the camera or behind the camera without the need of massive computations and without adding to the burden of the graphic rendering system.

SUMMARY

An objective of certain embodiments of the present invention is to provide a graphic rendering system. The graphic rendering system comprises a storage unit and a processing unit. The storage unit is stored with a piece of information, and the piece of information defines a virtual area in a camera space. The virtual area has a first vertex, a second vertex, and a third vertex. The processing unit determines that the first vertex and the second vertex are inside a view volume of the camera space and the third vertex is outside the view volume. The processing unit calculates a first intersection vertex of a first edge function and a near clipping plane of the view volume, wherein the first edge function is formed by the first vertex and the second vertex. The processing unit calculates a second intersection vertex of a second edge function and the near clipping plane, wherein the second edge function is formed by the second vertex and the third vertex. The processing unit respectively transforms the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex. The first projection vertex, the second projection vertex, the first projection intersection vertex, and the second projection intersection vertex form a valid area. The second projection vertex and the third projection vertex define a first projection edge function in the screen space. The first projection vertex and the third projection vertex define a second projection edge function in the screen space. The first projection vertex and the second projection vertex define a third projection edge function in the screen space. The processing unit chooses a test vertex from the valid area and determines that the third projection edge function should be multiplied by a minus sign according to the test vertex.

Another objective of certain embodiments of the present invention is to provide a graphic rendering system. The graphic rendering system comprises a storage unit and a processing unit. The storage unit is stored with a piece of information, and the piece of information defines a virtual area in a camera space. The virtual area has a first vertex, a second vertex, and a third vertex. The processing unit determines that the first vertex and the second vertex are outside a view volume of the camera space and the third vertex is inside the view volume. The processing unit calculates a first intersection vertex of a first edge function and a near clipping plane of the view volume, wherein the first edge function is formed by the first vertex and the third vertex. The processing unit calculates a second intersection vertex of a second edge function and the near clipping plane, wherein the second edge function is formed by the second vertex and the third vertex.

The processing unit respectively transforms the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex. The first projection intersection vertex, the second projection intersection vertex, and the third projection vertex form a valid area. The second projection vertex and the third projection vertex define a first projection edge function in the screen space, the first projection vertex and the third projection vertex define a second projection edge function in the screen space, and the first projection vertex and the second projection vertex define a third projection edge function in the screen space. The processing unit chooses a test vertex from the valid area, and determines that the first projection edge function and the second projection edge function should be individually multiplied by a minus sign according to the test vertex.

Yet another objective of certain embodiments of the present invention is to provide a projection method for use in a graphic rendering system. The graphic rendering system comprises a processing unit and a storage unit. The storage unit is stored with a piece of information, and the piece of information defines a virtual area in camera space. The virtual area has a first vertex, a second vertex, and a third vertex. The projection method comprises the following steps: (a) determining that the first vertex and the second vertex are inside a view volume of the camera space and the third vertex is outside the view volume by the processing unit; (b) calculating a first intersection vertex of a first edge function and a near clipping plane of the view volume by the processing unit, wherein the first edge function is formed by the first vertex and the third vertex; (c) calculating a second intersection vertex of a second edge function and the near clipping plane by the processing unit, wherein the second edge function is formed by the second vertex and the third vertex; (d) transforming the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex by the processing unit, respectively, wherein the first projection vertex, the second projection vertex, the first projection intersection vertex, and the second projection intersection vertex form a valid area, the second projection vertex and the third projection vertex define a first projection edge function in the screen space, the first projection vertex and the third projection vertex define a second projection edge function in the screen space, and the first projection vertex and the second projection vertex define a third projection edge function in the screen space; (e) choosing a test vertex from the valid area by the processing unit; and (f) determining that the third projection edge function should be multiplied by a minus sign according to the test vertex by the processing unit.

Still another objective of certain embodiments of the present invention is to provide a projection method for use in a graphic rendering system. The graphic rendering system comprises a processing unit and a storage unit. The storage unit is stored with a piece of information, and the information defines a virtual area in a camera space. The virtual area has a first vertex, a second vertex, and a third vertex. The projection method comprises the following steps: (a) determining that the first vertex and the second vertex are outside a view volume of the camera space and the third vertex is inside the view volume by the processing unit; (b) calculating a first intersection vertex of a first edge function and a near clipping plane of the view volume by the processing unit, wherein the first edge function is formed by the first vertex and the third vertex; (c) calculating a second intersection vertex of a second edge function and the near clipping plane by the processing unit, wherein the second edge function is formed by the second vertex and the third vertex; (d) transforming the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex by the processing unit, respectively, wherein the first projection intersection vertex, the second projection intersection vertex, and the third projection vertex form a valid area, the second projection vertex and the third projection vertex define a first projection edge function in the screen space, the first projection vertex and the third projection vertex define a second projection edge function in the screen space, and the first projection vertex and the second projection vertex define a third projection edge function in the screen space; (e) choosing a test vertex from the valid area by the processing unit; and (f) determining that the first projection edge function and the second projection edge function should be individually multiplied by a minus sign according to the test vertex by the processing unit.

According to the above descriptions, the present invention processes the virtual area that intersects the near clipping plane of the view volume. The present invention defines a valid area in the screen space, determines whether each of the projection edge functions should be adjusted with a minus sign according to a test vertex in the valid area. Finally, the present invention decides a pixel or pixels that will be rendered according to the valid area, the projection edge functions, and a predefined window clipping region. In this way, the object in the camera space can be quickly projected into the screen space and prevent the problems that were encountered when the object was placed too close to the camera or behind the camera.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 2A is a schematic view depicting an internal components of a graphic rendering system according to a first embodiment of the present invention;

FIG. 2B is a schematic view of a camera space according to the first embodiment of the present invention;

FIG. 2C is a schematic view of a screen space according to the first embodiment of the present invention;

DETAILED DESCRIPTION

Figure 1A:
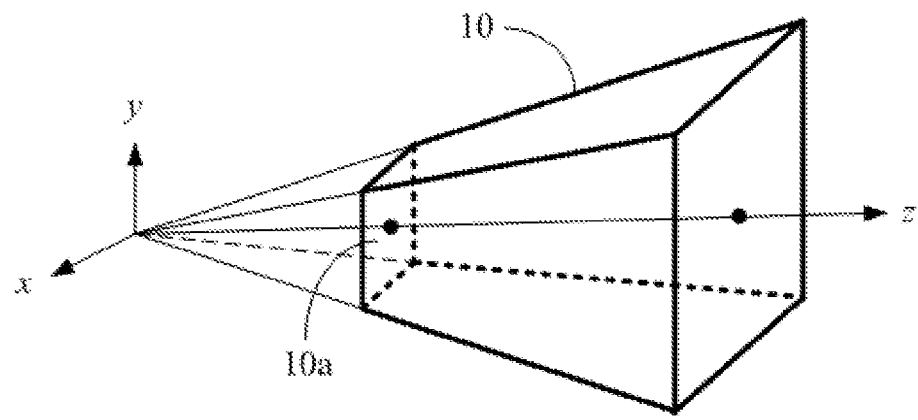
FIG. 1A is a schematic view of a view volume of a camera space.
Figure 1B:
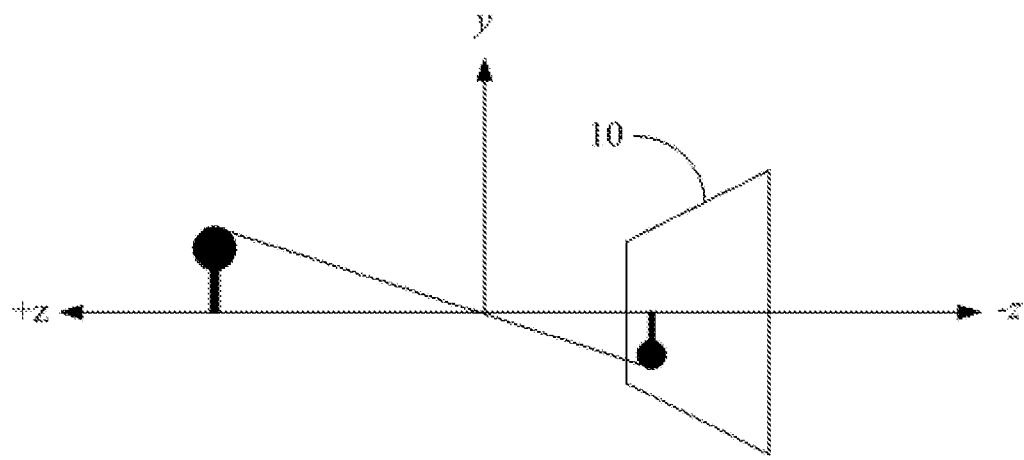
FIG. 1B is a schematic view depicting a flipping phenomenon.
Figure 1C:
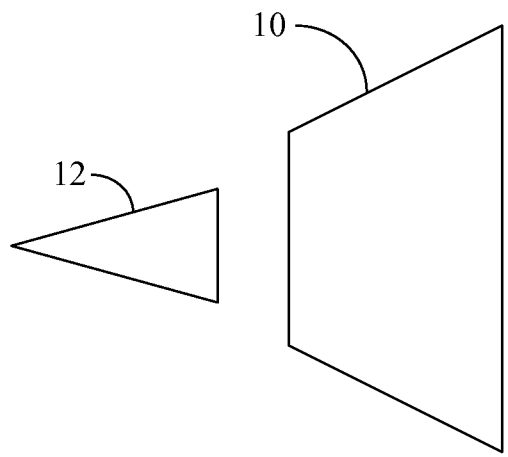
FIGS. 1C, 1D, 1E, and 1F are schematic views depicting a intersection of primitives and a plane of the view volume, respectively.
Figure 1D:
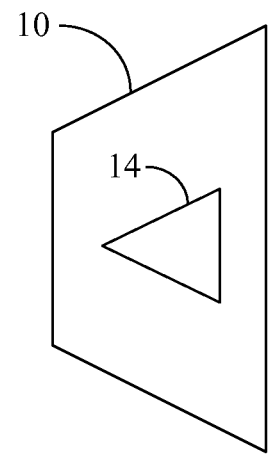
Figure 1E:
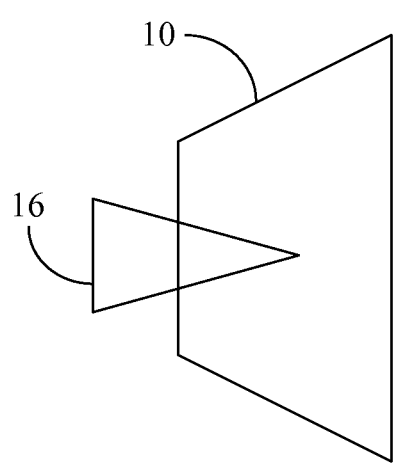
Figure 1F:
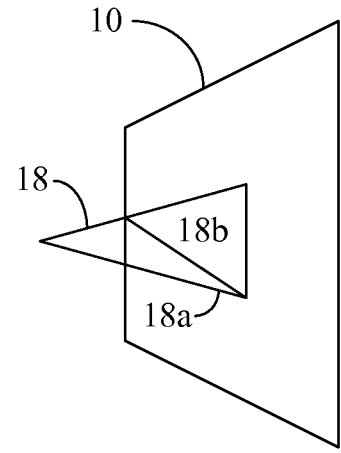

In the following description, the present invention will be explained with reference to example embodiments thereof. However, these example embodiments are not intended to limit the present invention to any specific example, embodiment, environment, applications, or particular implementations described in these embodiments. Therefore, the description of these example embodiments is only for the purpose of illustration rather than limitation. It should be appreciated that in the following embodiments and attached drawings, elements unrelated to the present invention are omitted from depiction.

A first embodiment of the present invention is a graphic rendering system 2, whose internal components are schematically shown in FIG. 2A. The graphic rendering system 2 comprises a processing unit 21 and a storage unit 23. The processing unit 21 may be a general type of processor, a central processing unit (CPUs), a microprocessor, or other computing device that is well known to those of ordinary skill in the art. The storage unit 23 may be a memory, a floppy disk, a hard disk, a compact disk (CD), a mobile disk, a magnetic tape, a database accessible to networks, or any other storage media with the same function and well known to those of ordinary skill in the art.

FIG. 2B illustrates a camera space of this embodiment. The camera space defines a view volume 20. The storage unit 23 of this embodiment stores a first piece of information, which defines a virtual area 22 in the camera space. The virtual area 22 may be considered as a primitive of a 3D object. The virtual area 22 has a first vertex 22a, a second vertex 22b, and a third vertex 22c. The first piece of information stored in the storage unit 23 may be the three vertices of the virtual area 22, three edge functions of the virtual area 22, or some other information.

The processing unit 21 allows for different types of processes depending on whether the virtual area intersects a near clipping plane 20a of the view volume 20. Specifically, the processing unit 21 determines whether the virtual area intersects the near clipping plane 20a according to the relative positional relationships between the near clipping plane 20a and the first vertex, the second vertex, and the third vertex of the virtual area. There are four possibilities in terms of whether the virtual area intersects the near clipping plane 20a: (a) two of the vertices of the virtual area are inside the view volume and the other vertex is outside the view volume; (b) one of the vertices of the virtual area is inside the view volume and the other two vertices are outside the view volume; (c) the virtual area does not intersect the near clipping plane 20a and is outside the view volume 20; and (d) the virtual area does not intersect the near clipping plane 20a and is inside the view volume 20.

First, the virtual area 22 shown in FIG. 2B is used for describing the case where two of the vertices of the virtual area are inside the view volume and the other vertex is outside the view volume. The processing unit 21 determines that the first vertex 22a and the second vertex 22b of the virtual area 22 are inside the view volume 20 of the camera space and the third vertex 22c of the virtual area 22 is outside the view volume 20. The first vertex 22a and the third vertex 22c form a first edge function, while the second vertex 22b and the third vertex 22c form a second edge function. The processing unit 21 calculates a first intersection vertex 22d of the first edge function and the near clipping plane 20a, as well as a second intersection vertex 22e of the second edge function and the near clipping plane 20a.

Afterwards, the processing unit 21 transforms the first vertex 22a, the second vertex 22b, the third vertex 22c, the first intersection vertex 22d, and the second intersection vertex 22e into a screen space to derive a first projection vertex 24a, a second projection vertex 24b, a third projection vertex 24c, a first projection intersection vertex 24d, and a second projection intersection vertex 24e as shown in FIG. 2C. The methods in which the vertices are transformed from the camera space into the screen space are well known by those of ordinary skill in the art, so the details are not further described herein.

In the screen space, the first projection vertex 24a, the second projection vertex 24b, the first projection intersection vertex 24d, and the second projection intersection vertex 24e form a valid area 25. A first projection edge function is located on the edge opposite to the first projection vertex 24a; in other words, the second projection vertex 24b and the third projection vertex 24c form the first projection edge function. Likewise, the second projection edge function is located on the edge opposite to the second projection vertex 24b; in other words, the first projection vertex 24a and the third projection vertex 24c form the second projection edge function. Similarly, the third projection edge function is located on the edge opposite to the third projection vertex 24c; in other words, the first projection vertex 24a and the second projection vertex 24b form the third projection edge function.

Then, the processing unit 21 chooses a test vertex from the valid area 25 and determines whether the first projection edge function, the second projection edge function, and the third projection edge function should be individually multiplied by a minus sign according to the test vertex. This will be detailed in the following paragraphs.

Figure 2D:
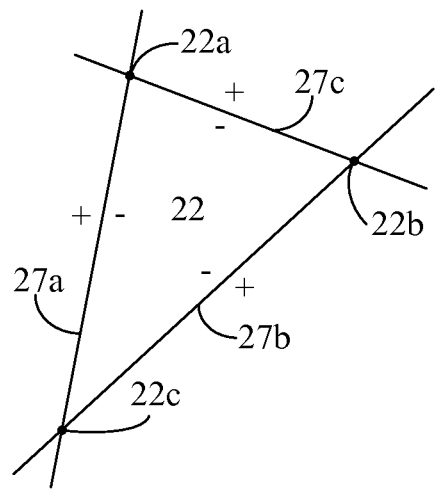
FIG. 2D is a schematic view of a virtual area in the camera space.

FIG. 2D illustrates the virtual area 22 in the camera space. As described above, the virtual area 22 defines the first vertex 22a, the second vertex 22b, the third vertex 22c, a first edge function 27a, a second edge function 27b, and a third edge function 27c. It is assumed herein that the virtual area 22 is of a negative-value range, comparing to the first edge function 27a, the second edge function 27b and the third edge function 27c. That is, substituting any point of the virtual area 22 into any of the first edge function 27a, the second edge function 27b, and the third edge function 27c will result in a negative value. Therefore, after the virtual area 22 is projected to the screen space, substituting any point of the screen space corresponding to the virtual area 22 into the first projection edge function, the second projection edge function, and the third projection edge function will result in a negative value, theoretically. Nevertheless, exceptions may occur in practice as addressed in the "Descriptions of the Related Art."

Without considering other clipping planes of the view volume 20, the valid area 25 is an area obtained by projecting the virtual area 22 into the screen space. Hence, the processing unit 21 uses the valid area 25 to adjust the first projection edge function, the second projection edge function, and the third projection edge function. Specifically, the processing unit 21 chooses a test vertex from the valid area 25 and substitutes the test vertex into the first projection edge function, the second projection edge function, and the third projection edge function. If substituting the test vertex into the first projection edge function results in a positive value, the processing unit 21 will multiply the first projection edge function with a minus sign to change the sign thereof. Similarly, the same determination and process are made by the processing unit 21 on the second projection edge function and the third projection edge function.

Figure 2E:
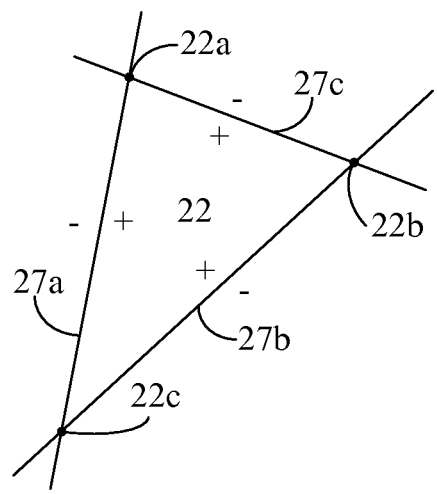
FIG. 2E is another schematic view of the virtual area in the camera space.

FIG. 2E illustrates a virtual area 22 in the camera space. It is assumed that the virtual area 22 is of a positive-value range, comparing to the first edge function 27a, the second edge function 27b, and the third edge function 27c. That is, substituting any point of the virtual area 22 into any of the first edge function 27a, the second edge function 27b, and the third edge function 27c will result in a positive value. In this case, the processing unit 21 also chooses a test vertex from the valid area 25 and substitutes the test vertex into the first projection edge function, the second projection edge function, and the third projection edge function. If substituting the test vertex into the first projection edge function results in a negative value, then the processing unit 21 multiplies the first projection edge function by a minus sign to change the sign thereof. Similarly, the same determination and processing are made by the processing unit 21 on the second projection edge function and the third projection edge function.

As the third vertex 22c is outside the view volume and the first vertex 22a and the second vertex 22b are inside the view volume, the processing unit 21 determines that the third projection edge function should be multiplied by a minus sign.

The adjusted first projection edge function, the second projection edge function, and the third projection edge function define a projection area. Each of the projection range and the valid area 25 corresponds to a plurality of pixels in the screen space. The processing unit 21 compares each of the pixels in the valid area 25 with the projection area and a predefined window clipping region. The predefined window clipping region corresponds to the four clipping planes adjacent to the near clipping plane 20a in the camera space. For each of the pixels in the valid area 25, if the pixel falls within the projection area and the predefined window clipping region, then the processing unit 21 labels it as a pixel to be rendered.

Figure 2F:
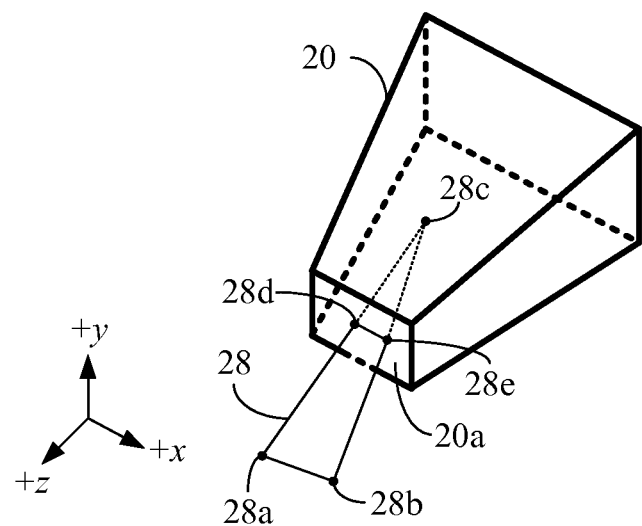
FIG. 2F is a schematic view of another camera space according to the first embodiment of the present invention.

Next, FIG. 2F illustrates the case where two of the vertices of the virtual area are inside the view volume and the other vertex is outside the view volume. It is assumed that the storage unit 23 stores a second piece of information, which defines a virtual area 28 in the camera space. The virtual area 28 may also be realized as a primitive of a 3D object. The virtual area 28 has a first vertex 28a, a second vertex 28b, and a third vertex 28c.

The processing unit 21 determines that the first vertex 28a and the second vertex 28b are outside the view volume 20 of the camera space and the third vertex 28c is inside the view volume 20. The first vertex 28a and the third vertex 28c form a first edge function, while the second vertex 28b and the third vertex 28c form a second edge function. The processing unit 21 calculates a first intersection vertex 28d of the first edge function and the near clipping plane 20a, as well as a second intersection vertex 28e of a second edge function and the near clipping plane 20a.

Figure 2G:
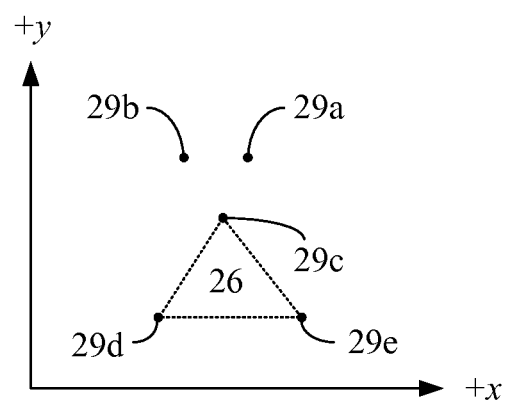
FIG. 2G is a schematic view of another screen space according to the first embodiment of the present invention.

Next, the processing unit 21 transforms the first vertex 28a, the second vertex 28b, the third vertex 28c, the first intersection vertex 28d, and the second intersection vertex 28e into a screen space to derive a first projection vertex 29a, a second projection vertex 29b, a third projection vertex 29c, a first projection intersection vertex 29d, and a second projection intersection vertex 29e as shown in FIG. 2G. The first projection intersection vertex 29d, the second projection intersection vertex 29e, and the third projection vertex 29c form a valid area 26. The first projection edge function is located on the edge opposite to the first projection vertex 29a; in other words, the second projection vertex 29b and the third projection vertex 29c form the first projection edge function. Likewise, the second projection edge function is located on the edge opposite to the second projection vertex 29b; in other words, the first projection vertex 29a and the third projection vertex 29c form the second projection edge function. Also, the third projection edge function is located on the edge opposite to the third projection vertex 29c; in other words, the first projection vertex 29a and the second projection vertex 29b form the third projection edge function.

Afterwards, the processing unit 21 chooses a test vertex from the valid area 26. Then, the processing unit 21 adopts the same way as described above to determine whether the first projection edge function, the second projection edge function, and the third projection edge function should be multiplied by a minus sign according to the test vertex. Specifically, as the first vertex 28a and the second vertex 28b are outside the view volume and the third vertex 28c is inside the view volume, the processing unit 21 determines that the first projection edge function and the second projection edge function should be individually multiplied by a minus sign.

The adjusted first projection edge function, the second projection edge function, and the third projection edge function define a projection area. The projection area and the valid area 26 each correspond to a plurality of pixels in the screen space. The processing unit 21 compares each of the pixels in the valid area 26 with the projection area and a predefined window clipping region. The predefined window clipping region corresponds to the four clipping planes adjacent to the near clipping plane 20a in the camera space. For each of the pixels in the valid area 26, if the pixel falls within the projection area and the predefined window clipping region, then the processing unit 26 labels it as a pixel to be rendered.

It is assumed that the storage unit 23 stores a third piece of information. The third piece of information defines another virtual area in the camera space, which does not intersect the near clipping plane 20a and is outside the view volume 20. In this case, the processing unit 21 ignores the virtual area. Furthermore, it is assumed that the storage unit 23 stores a fourth piece of information. The fourth piece of information defines another virtual area in the camera space, which does not intersect the near clipping plane 20a and is inside the view volume 20. In this case, the processing unit 21 directly projects the virtual area to the screen space and labels the whole area projected to the screen space as an area to be rendered.

Figure 3A:
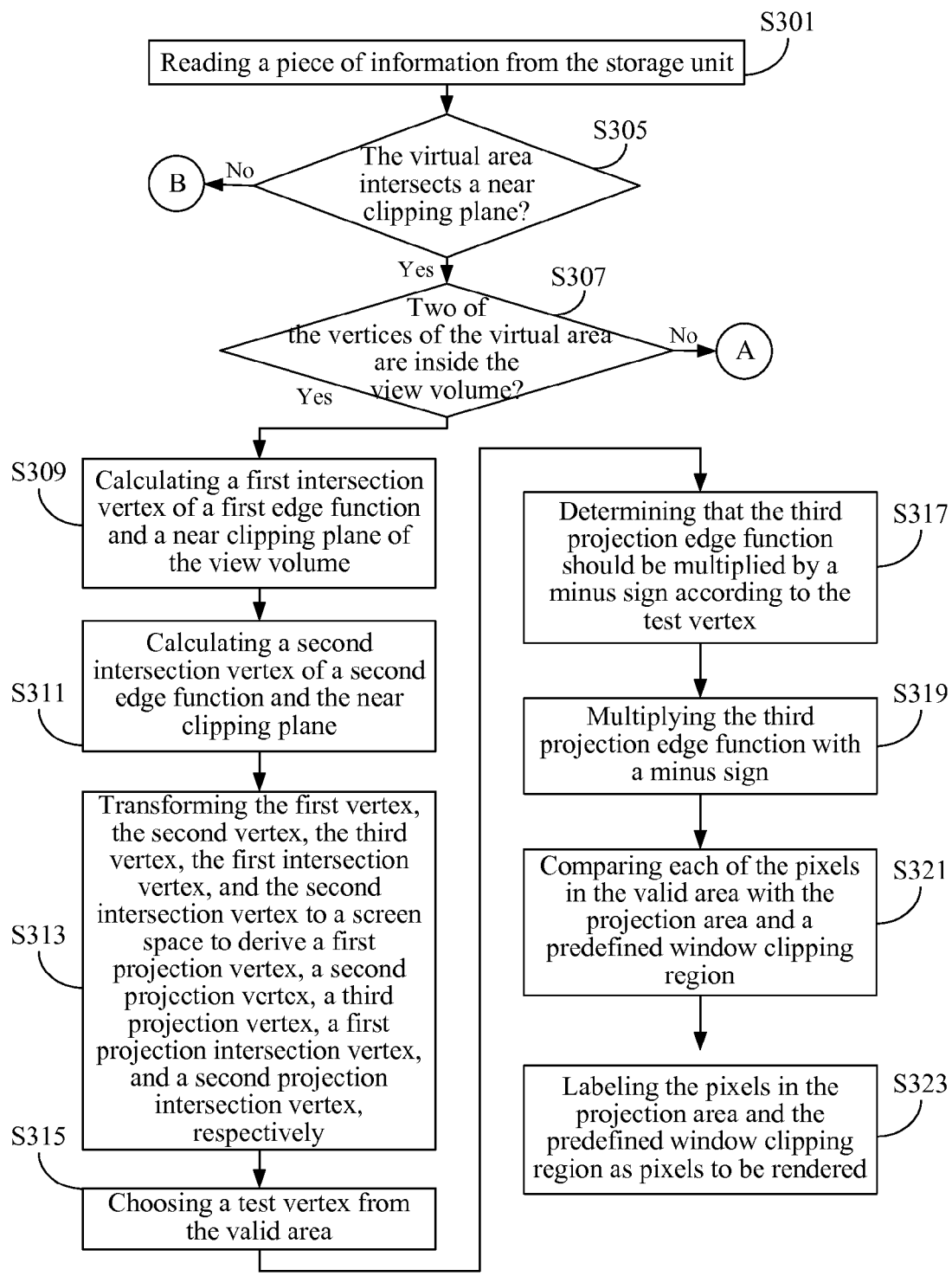
FIGS. 3A, 3B and 3C are flowcharts of a second embodiment of the present invention.
Figure 3B:
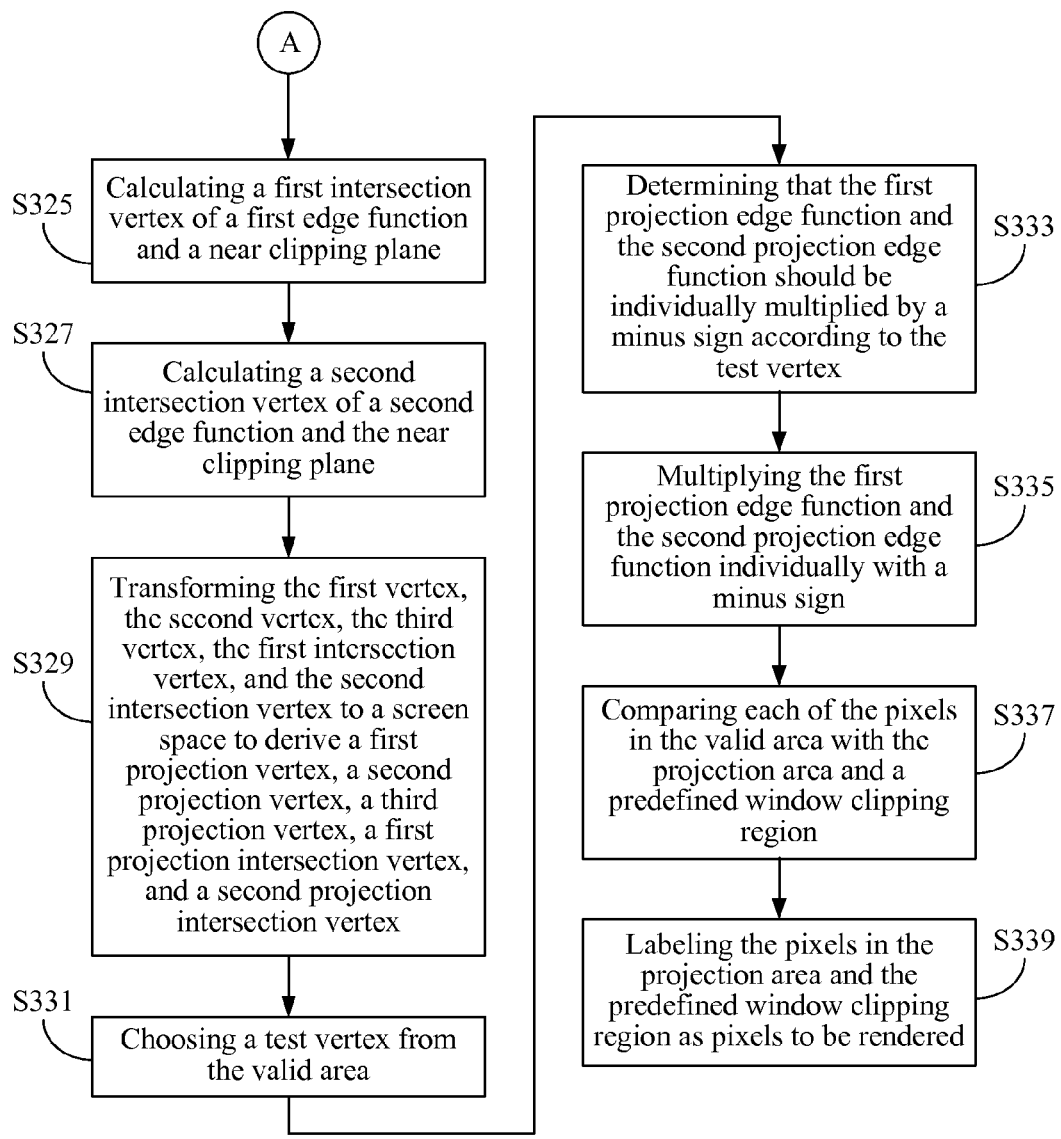
Figure 3C:
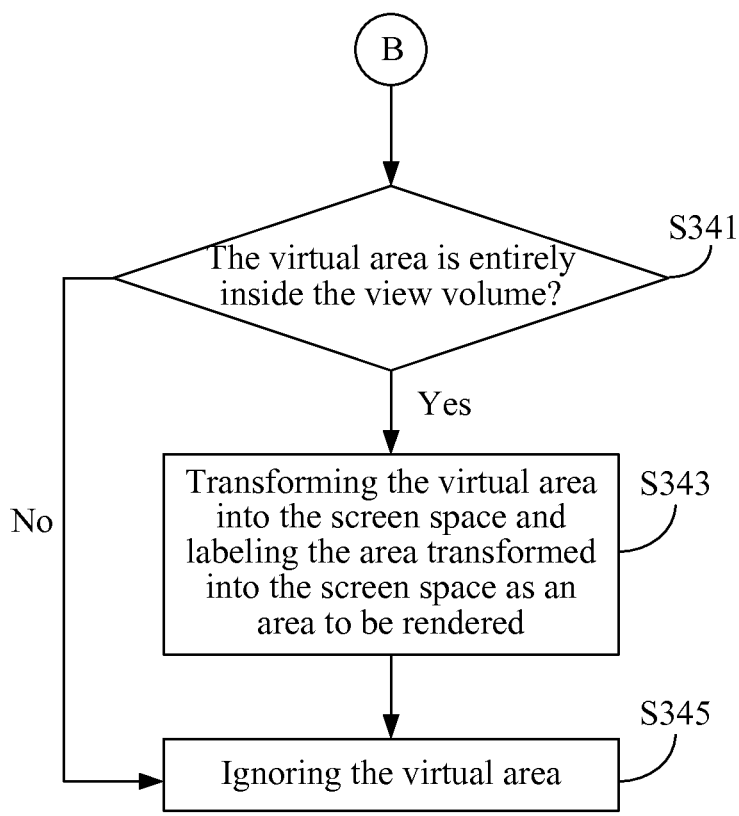

A second embodiment of the present invention is a projection method for use in a graphic rendering system, a flowchart of which is depicted in FIGS. 3A, 3B, and 3C. The graphic rendering system may be the graphic rendering system 2 of the first embodiment. The graphic rendering system comprises a processing unit and a storage unit. The storage unit is stored with a piece of information.

First, step S301 is executed to enable the processing unit to read a piece of information from the storage unit. The information defines a virtual area in a camera space. The virtual area has a first vertex, a second vertex, and a third vertex. Then, step S305 is executed to determine whether the virtual area intersects a near clipping plane of a view volume in the camera space by the processing unit.

If the answer of step S305 is "yes", then step S307 is executed to determine whether two of the vertices are inside the view volume and the other vertex is outside the view volume by the processing unit. If the answer of step S307 is "yes" and it is assumed that the first vertex and the second vertex are inside the view volume and the third vertex is outside the view volume, then step S309 is executed to enable the processing unit to calculate a first intersection vertex of a first edge function and a near clipping plane of the view volume, wherein the first edge function is formed by the first vertex and the third vertex. Then, step S311 is executed to enable the processing unit to calculate a second intersection vertex of a second edge function and the near clipping plane, wherein the second edge function is formed by the second vertex and the third vertex.

The method of this embodiment then proceeds to step S313 to enable the processing unit to transform the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex, respectively. The first projection vertex, the second projection vertex, the first projection intersection vertex, and the second projection intersection vertex form a valid area. The second projection vertex and the third projection vertex define a first projection edge function in the screen space. The first projection vertex and the third projection vertex define a second projection edge function in the screen space. The first projection vertex and the second projection vertex define a third projection edge function in the screen space.

Afterwards, step S315 is executed to choose a test vertex from the valid area by the processing unit. Following that, step S317 is executed to enable the processing unit to determine that the third projection edge function should be multiplied by a minus sign according to the test vertex. Then, step S319 is executed to enable the processing unit to multiply the third projection edge function with a minus sign according to the determination result of step S317.

The first projection edge function, the second projection edge function, and the third projection edge function define a projection area, and the valid area corresponds to a plurality of pixels in the screen space. Then, the method of this embodiment proceeds to step S321 to compare each of the pixels in the valid area with the projection area and a predefined window clipping region by the processing unit. Then, step S323 is executed to enable the processing unit to label the pixels in both the projection area and the predefined window clipping region as pixels to be rendered.

On the other hand, if the answer of step S307 is "no," it means that two of the vertices are outside the view volume and the other vertex is inside the view volume. It is assumed that the first vertex and the second vertex are outside the view volume of the camera space and the third vertex is inside the view volume. Then, step S325 and step S327 are executed by the processing unit to calculate the first intersection vertex of a first edge function and the near clipping plane of the view volume, and to calculate the second intersection vertex of a second edge function and the near clipping plane. The first edge function is formed by the first vertex and the third vertex, and the second edge function is formed by the second vertex and the third vertex.

Afterwards, step S329 is executed by the processing unit to transform the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex. The first projection intersection vertex, the second projection intersection vertex, and the third projection vertex form a valid area. The second projection vertex and the third projection vertex define a first projection edge function in the screen space. The first projection vertex and the third projection vertex define a second projection edge function in the screen space. The first projection vertex and the second projection vertex define a third projection edge function in the screen space.

The method of this embodiment then proceeds to step S331 to enable the processing unit to choose a test vertex from the valid area. Step S333 is executed by the processing unit to determine that the first projection edge function and the second projection edge function should be individually multiplied by a minus sign according to the test vertex. Then, step S335 is executed by the processing unit to multiply the first projection edge function and the second projection edge function individually with a minus sign according to the determination results of step S333.

The first projection edge function, the second projection edge function, and the third projection edge function define a projection area, and the valid area corresponds to a plurality of pixels in the screen space. Then, the method of this embodiment proceeds to step S337 to enable the processing unit to compare each of the pixels in the valid area with the projection area and a predefined window clipping region. Then, step S339 is executed by the processing unit to label the pixels in both the projection area and the predefined window clipping region as pixels to be rendered.

On the other hand, if the answer of step S305 is "no," this embodiment proceeds to step S341 to enable the processing unit to determine whether the virtual area is entirely inside the view volume. If the answer of step S341 is "yes," then step S343 is executed by the processing unit to transform the virtual area into the screen space and label the area transformed into the screen space as an area to be rendered. If the answer of step S341 is "no," then it means that the virtual area is entirely outside the view volume, so step S345 is executed by the processing unit to ignore the virtual area.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus will not be further described herein.

The projection method described in the second embodiment may be implemented by a computer program product. When the computer program product is loaded into the graphic rendering system and a plurality of codes comprised in the computer program product is executed, the projection method described in the second embodiment can be accomplished. This computer program product may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the present invention allows for processing on the virtual area that intersects the near clipping plane of the view volume. According to the present invention, a valid area is labeled in the screen space, and then according to a test vertex in the valid area, it is determined whether it is necessary to adjust individual projection edge functions to have a plus or minus sign. Finally, a pixel to be rendered is determined according to the valid area, the projection edge functions and a predefined window clipping region. In this way, the object in the camera space can be quickly projected to the screen space and the problems that occur when the object is placed too close to the camera or behind the camera can be solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A graphic rendering system, comprising:
a storage unit, being stored with a piece of information, the piece of information defining a virtual area in a camera space, the virtual area having a first vertex, a second vertex, and a third vertex; and
a processing unit, for determining that the first vertex and the second vertex are inside a view volume of the camera space and the third vertex is outside the view volume, the processing unit calculating a first intersection vertex of a first edge function and a near clipping plane of the view volume, the first edge function being formed by the first vertex and the third vertex, the processing unit calculating a second intersection vertex of a second edge function and the near clipping plane, the second edge function being formed by the second vertex and the third vertex, the processing unit respectively transforming the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex,
wherein the first projection vertex, the second projection vertex, the first projection intersection vertex, and the second projection intersection vertex form a valid area, the second projection vertex and the third projection vertex define a first projection edge function in the screen space, the first projection vertex and the third projection vertex define a second projection edge function in the screen space, the first projection vertex and the second projection vertex define a third projection edge function in the screen space, the processing unit chooses a test vertex from the valid area, and the processing unit determines that the third projection edge function should be multiplied by a minus sign according to the test vertex.

2. The graphic rendering system of claim 1, wherein the processing unit further multiplies the minus sign to the third projection edge function.

3. The graphic rendering system of claim 1, wherein the first projection edge function, the second projection edge function, and the third projection edge function define a projection area, the valid area corresponds to a plurality of pixels of the screen space, the processing unit further compares each of the pixels in the valid area with the projection area and a predefined window clipping region.

4. The graphic rendering system of claim 3, wherein the processing unit further determines that the pixels in both the projection area and the predefined window clipping region should be rendered.

5. A graphic rendering system, comprising:
a storage unit, being stored with a piece of information, the piece of information defining a virtual area in a camera space, the virtual area having a first vertex, a second vertex, and a third vertex; and
a processing unit, for determining that the first vertex and the second vertex are outside a view volume of the camera space and the third vertex is inside the view volume, the processing unit calculating a first intersection vertex of a first edge function and a near clipping plane of the view volume, the first edge function being formed by the first vertex and the third vertex, the processing unit calculating a second intersection vertex of a second edge function and the near clipping plane, the second edge function being formed by the second vertex and the third vertex, the processing unit respectively transforming the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex,
wherein the first projection intersection vertex, the second projection intersection vertex, and the third projection vertex form a valid area, the second projection vertex and the third projection vertex define a first projection edge function in the screen space, the first projection vertex and the third projection vertex define a second projection edge function in the screen space, the first projection vertex and the second projection vertex define a third projection edge function in the screen space, the processing unit chooses a test vertex from the valid area, and the processing unit determines that the first projection edge function and the second projection edge function should be individually multiplied by a minus sign according to the test vertex.

6. The graphic rendering system of claim 5, wherein the processing unit further multiplies the minus sign to the first projection edge function and the second projection edge function individually.

7. The graphic rendering system of claim 5, wherein the first projection edge function, the second projection edge function, and the third projection edge function define a projection area, the valid area corresponds to a plurality of pixels of the screen space, the processing unit further compares each of the pixels in the valid area with the projection area and a predefined window clipping region.

8. The graphic rendering system as claimed in claim 7, wherein the processing unit further determines that the pixels in both the projection area and the predefined window clipping region should be rendered.

9. A projection method for use in a graphic rendering system, the graphic rendering system comprises a processing unit and a storage unit, the storage unit being stored with a piece of information, the piece of information defining a virtual area in a camera space, the virtual area having a first vertex, a second vertex, and a third vertex, the projection method comprising the steps of:

(a) determining, by the processing unit, that the first vertex and the second vertex are inside a view volume of the camera space and the third vertex is outside the view volume;

(b) calculating, by the processing unit, a first intersection vertex of a first edge function and a near clipping plane of the view volume, wherein the first edge function is formed by the first vertex and the third vertex;

(c) calculating, by the processing unit, by the processing unit, a second intersection vertex of a second edge function and the near clipping plane, wherein the second edge function is formed by the second vertex and the third vertex;

(d) transforming, by the processing unit, the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex, respectively, wherein the first projection vertex, the second projection vertex, the first projection intersection vertex, and the second projection intersection vertex form a valid area, the second projection vertex and the third projection vertex define a first projection edge function in the screen space, the first projection vertex and the third projection vertex define a second projection edge function in the screen space, the first projection vertex and the second projection vertex define a third projection edge function in the screen space;

(e) choosing, by the processing unit, a test vertex from the valid area; and (f) determining, by the processing unit, that the third projection edge function should be multiplied by a minus sign according to the test vertex.

10. The projection method of claim 9, further comprising the step of:

(g) multiplying, by the processing unit, the minus sign to the third projection edge function.

11. The projection method of claim 9, wherein the first projection edge function, the second projection edge function, and the third projection edge function define a projection area, the valid area corresponds to a plurality of pixels of the screen space, the projection method further comprises the step of:

(g) comparing, by the processing unit, each of the pixels in the valid area with the projection area and a predefined window clipping region after step (f).

12. The projection method of claim 11, further comprising the step of:

(h) determining, by the processing unit, that the pixels in both the projection area and the predefined window clipping region should be rendered after step (g).

13. A projection method for use in a graphic rendering system, the graphic rendering system comprising a processing unit and a storage unit, the storage unit being stored with a piece of information, the information defining a virtual area in a camera space, the virtual area having a first vertex, a second vertex, and a third vertex, the projection method comprising the steps of:

(a) determining, by the processing unit, that the first vertex and the second vertex are outside a view volume of the camera space and the third vertex is inside the view volume;

(b) calculating, by the processing unit, a first intersection vertex of a first edge function and a near clipping plane of the view volume, wherein the first edge function is formed by the first vertex and the third vertex;

(c) calculating, by the processing unit, a second intersection vertex of a second edge function and the near clipping plane, wherein the second edge function is formed by the second vertex and the third vertex;

(d) transforming, by the processing unit, the first vertex, the second vertex, the third vertex, the first intersection vertex, and the second intersection vertex to a screen space to derive a first projection vertex, a second projection vertex, a third projection vertex, a first projection intersection vertex, and a second projection intersection vertex, respectively, wherein the first projection intersection vertex, the second projection intersection vertex, and the third projection vertex form a valid area, the second projection vertex and the third projection vertex define a first projection edge function in the screen space, the first projection vertex and the third projection vertex define a second projection edge function in the screen space, the first projection vertex and the second projection vertex define a third projection edge function in the screen space;

(e) choosing, by the processing unit, a test vertex from the valid area; and (f) determining, by the processing unit, that the first projection edge function and the second projection edge function should be individually multiplied by a minus sign according to the test vertex.

14. The projection method of claim 13, further comprising the step of:

(g) multiplying, by the processing unit, the minus sign to the first projection edge function and the second projection edge function individually.

15. The projection method of claim 13, wherein the first projection edge function, the second projection edge function, and the third projection edge function define a projection area, the valid area corresponds to a plurality of pixels of the screen space, the projection method further comprises the step of:

(g) comparing, by the processing unit, each of the pixels in the valid area with the projection area and a predefined window clipping region after step (f).

16. The projection method of claim 15, further comprising the step of:

(h) determining, by the processing unit, that the pixels in both the projection area and the predefined window clipping region should be rendered after step (g).

* * * * *